May 2, 1961 J. F. KLINKHAMER 2,982,820

ARRANGEMENT FOR REDUCING CROSSTALK IN AUTOMATIC TELEPHONE EXCHANGES

Filed Nov. 12, 1957

INVENTOR
JACOB FREDRIK KLINKHAMER

BY Frank R. Jifari
AGENT

United States Patent Office 2,982,820

Patented May 2, 1961

2,982,820

ARRANGEMENT FOR REDUCING CROSSTALK IN AUTOMATIC TELEPHONE EXCHANGES

Jacob Fredrik Klinkhamer, Eindhoven, Netherlands, assignor to North American Philips Company, Inc., New York, N.Y., a corporation of Delaware Filed Nov. 12, 1957, Ser. No. 695,960

Claims priority, application Netherlands Dec. 20, 1956

2 Claims. (Cl. 179—16)

This invention relates to arrangements for reducing crosstalk in automatic telephone exchanges.

In automatic telephone systems comprising mechanical switches, it is common practice to make through-connections by switching in each of the two line wires by means of different wipers of the switch, so that the speech circuits are balanced with respect to ground and there is little risk of crosstalk. In telephone systems comprising electronic switching means, it is common practice, for reducing the required number of electronic speech contacts, to make the telephone switching connections in a single wire only, return telephone currents being led through common wires connected to ground, which are not used for switching. In this case, the speech circuits are not balanced and hence risk of crosstalk, is involved. Crosstalk, which is attributable to capacitive couplings between different line wires, may be suppressed by means of shielding. However, crosstalk may then still occur as a result of inductive couplings between the various line wires and the finite resistance of the common return conductors.

According to the invention, in an automatic telephone exchange in which telephone connections are established by means of a single wire and return telephone currents are led through conductors which are not used for switching, crosstalk is reduced in that individual return conductors associated with the line wires are connected, at the beginning and at the end of the line wires, to multiple points common to a plurality of return conductors and that several windings of an individual transformer having a transformation ratio equal to unity are connected in series with each line wire and its associated return conductor, in a manner such that currents flowing in opposite directions in the line wire and the associated return conductor counteract each other magnetically in the transformer. This step permits of obtaining a reduction in crosstalk of from 40 to 80 db.

Figure 1:
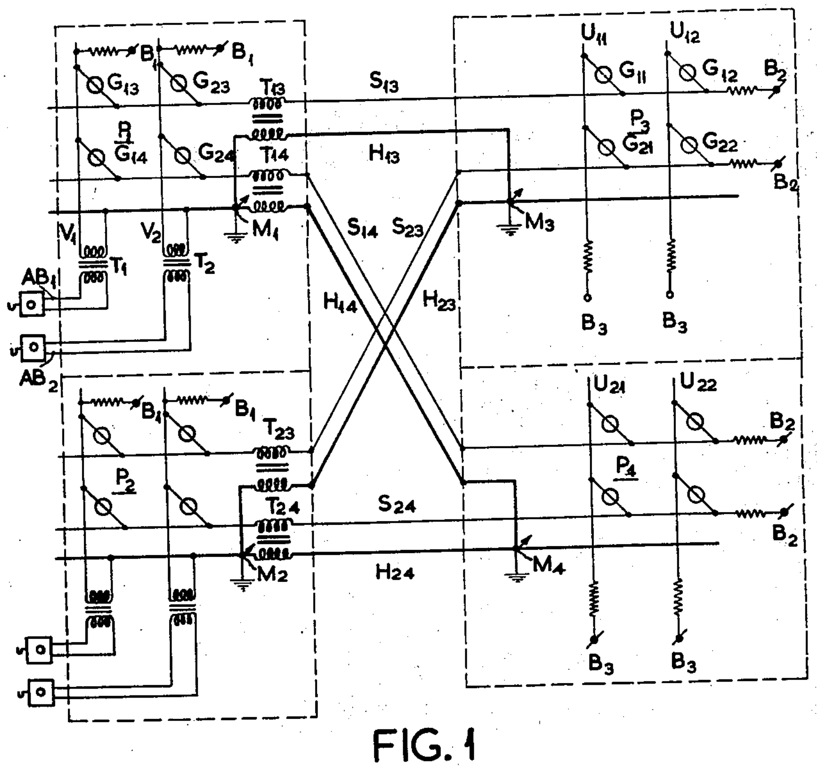
Figure 2:
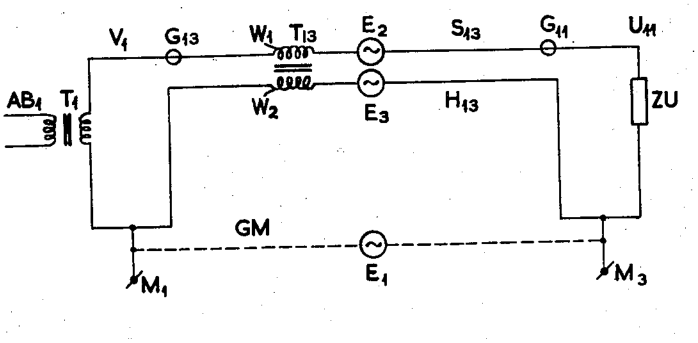

In order that the invention may be more readily carried into effect, it will now be described more fully, by way of example, with reference to the accompanying drawing, in which:

Fig. 1 shows, in diagrammatic and simplified form, an example of the arrangement of telephone connections in part of an electronic telephone exchange and Fig. 2 shows a detail circuit, by means of which the operation of the arrangement according to the invention will be explained.

The circuit arrangement shown in Fig. 1 comprises two primary switches P1, P2 and two secondary switches P3, P4, which switches are of the crossbar type. The vertical conductors of these switches may be connected to the horizontal conductors by means of the contacts corresponding to different crossings. Thus, inlet conductors V1 and V2 of the switch P1 may be connected to outlet conductors S13, S14 by means of speech contacts G13, G14, G23, G24 and inlet conductors S13 and S23 of the switch P3 may be connected to outlet conductors U11 and U12 by means of speech contacts G11, G12, G21, G22. The speech contacts may be of the mechanical type or the electronic type and constituted, for example, by rectifiers, gaseous discharge paths or transistors. The manner in which these speech contacts may be controlled for establishing a telephone connection is not shown, but this is not necessary for proper understanding of the invention. The vertical conductors V1 and V2 are connected through a winding on each of transformers T1 and T2 to the multiple ground point M1, which is common to the switch P1, and also coupled through said transformers to subscriber's lines AB1 and AB2. The vertical conductors of the switches P1 and P2 are connected through resistors to a voltage source B1, the line wires S13, S14, S23, S24 are connected to a voltage source B2 and the vertical conductors of the switches P3 and P4 are connected to a voltage source B3. The line wires S13, S14, S23, S24, by which the primary switches P1 and P2 are connected to the secondary switches P3 and P4, have associated with them individual return conductors H13, H14, H23, H24, which are connected to the multiple points M1 and M2 of the primary switches P1 and P2 and to the multiple points M3 and M4 of the secondary switches T3 and T4 respectively. The return conductors are preferably twisted with the associated line wires. Connected in series with the line wires S13, S14, S23, S24 are windings of transformers T13, T14, T23, T24, the second windings of which, such having a number of turns equal to that of the first winding, are connected in series with the corresponding return conductors H13, H14, H23, H24. The windings are connected in a manner such that currents flowing in opposite directions in the line wires and the associated return conductors magnetically counteract each other. For these currents, the impedance constituted by the transformer is thus small, whereas for currents flowing in one direction only, the imepdance is high. The multiple points M1, M2, M3, M4 are preferably connected together and to earth by means of conductors (not shown).

The above-mentioned arrangement operates as follows:

Fig. 2 shows a telephone connection between the subscriber's line AB1 and the outlet conductor U11, in which the telephone current can flow via transformer T1, conductor V1, speech contact G13 in the conductive state, winding W1 of transformer T13, conductor S13, speech contact G11 in the conductive state, outlet conductor U11 and output impedance ZU. In the absence of transformer T13, the return telephone current would divide itself over the return conductor H13 and the other return conductors indicated by GM in the figure. However, since the transformer T13, as previously mentioned, constitutes a high impedance for currents flowing in one direction only in the conductors S13 and H13, but a low impedance for currents flowing in opposite directions, substantially the last-mentioned currents only can flow so that due to the action of transformer T13, substantially the whole return current flows through the return conductor H13 and only a very small portion flows through the other return conductors GM. As a result of the finite resistance of the return conductors GM, telephone currents in other telephone connections might still give rise to a small crosstalk voltage between the multiple points M1 and M3, as shown by the voltage source E1. This voltage is active in the telephone current circuit via transformer T1, conductor V1, speech contact G13, winding W1, conductor S13, speech contact G11, conductor U11 and impedance ZU. However, winding W2 of transformer T13, which is connected via conductor H13, between the multiple points M1 and M3, induces in the telephone current circuit, via winding W1, a voltage of the same value, but of opposite phase, so that the crosstalk voltage E1 is inactive and cannot give rise to a voltage across the subscriber's line AB1 or the output impedance ZU.

Telephone currents in adjacent line wires may induce a crosstalk voltage in the above-mentioned telephone circuit, as shown by the voltage source E2 in Fig. 2. Since the return conductor H13 is twisted with the line wire S13, a voltage E3 is also induced in the conductor H13, which voltage is equal and equally directed to the voltage E2. In the absence of transformer T13, said voltages in the conductors S13 and H13 would, independently of each other, produce current flow in one direction in these conductors, which would be closed through the common return conductors GM. The current through conductor S13 would then result in a voltage drop across the subscriber's line AB1 and the output impedance ZU. However, the transformer T13 greatly attenuates such currents. The current in the circuit constituted by the line wires and the return conductor, which current is thus oppositely directed in the conductors S13 and H13, is proportional to the sum of the electromotive forces in this circuit, which sum in this case is zero. Consequently, the crosstalk voltages E2 and E3 are made substantially ineffective.

A telephone current flowing in this circuit is substantially not hindered by the presence of transformer T13.

What is claimed is:

1. An automatic telephone exchange comprising a plurality of telephone circuits each comprising two conductors, switching means for each of said circuits arranged respectively in only one conductor of each circuit, and means for reducing crosstalk between said circuits comprising means for connecting the ends of the other conductor of each circuit to multiple ground points common to a plurality of other conductors of other said circuits, and a separate transformer having two windings in unity transformation ratio for each of said circuits, one winding of each transformer being connected in series with said one conductor of the respective circuit and the other winding of each transformer being connected in series with the other conductor of the respective circuit, said windings being poled such that currents flowing in opposite directions in the conductors of the respective circuit produce counteracting magnetic fields in the respective transformer.

2. Means for reducing crosstalk in an automatic telephone exchange of the type in which connections between a plurality of subscribers lines are established by means of a plurality of circuits each comprising a switched conductor and an unswitched conductor, said crosstalk reducing means comprising means for connecting the ends of each unswitched conductor to multiple ground points common to the unswitched conductors of other said circuits, and a separate transformer for each said circuit, each transformer having a first winding connected in series with the switched conductor of the respective circuit and a second winding connected in series with the unswitched conductor of the respective circuit, the windings of said transformers having unity transformation ratio and being poled such that currents flowing in opposite directions in the conductors of the respective circuit produce counteracting magnetic fields in the respective transformer.

References Cited in the file of this patent

UNITED STATES PATENTS

| | | |
|---|---|---|
| 2,763,722 | Six et al. | Sept. 18, 1956 |
| 2,774,071 | Trousdale | Dec. 11, 1956 |
| 2,779,822 | Ketchledge | Jan. 29, 1957 |
| 2,780,674 | Six et al. | Feb. 5, 1957 |